I. B. IRONS.
TIRE.
APPLICATION FILED APR. 23, 1917.

1,233,478.

Patented July 17, 1917.

Inventor.
ISON B. IRONS
By Watson E. Coleman
Attorney

UNITED STATES PATENT OFFICE.

ISON B. IRONS, OF MORGANTOWN, WEST VIRGINIA.

TIRE.

1,233,478.　　　　　　　Specification of Letters Patent.　　　Patented July 17, 1917.

Application filed April 23, 1917.　Serial No. 163,978.

*To all whom it may concern:*

Be it known that I, ISON B. IRONS, a citizen of the United States, residing at Morgantown, in the county of Monongalia and State of West Virginia, have invented certain new and useful Improvements in Tires, of which the following is a specification, reference being had to the accompanying drawings.

This invention relates to certain improvements in tires and has relation more particularly to a device of this general character of a cushion type; and it is an object of the invention to provide a tire of this general character including a novel and improved core adapted to be inclosed within the casing or carcass of a tire and which effectually serves to absorb the shocks and jars incident to travel.

The invention consists in the details of construction and in the combination and arrangement of the several parts of my improved tire whereby certain important advantages are attained and the device is rendered simpler, less expensive and otherwise more convenient and advantageous for use, all as will be hereinafter more fully set forth.

The novel features of the invention will hereinafter be definitely claimed.

Figure 1:
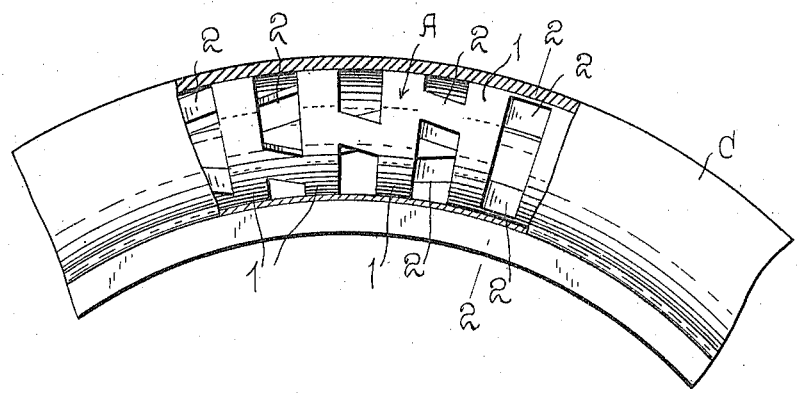
Figure 2:
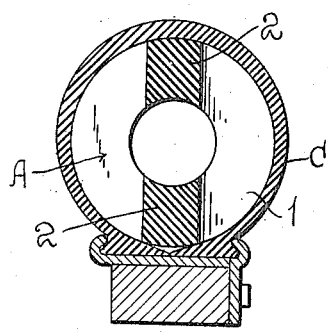

In order that my invention may be the better understood, I will now proceed to describe the same with reference to the accompanying drawings, wherein Figure 1 is a fragmentary view partly in elevation and partly in section illustrating a tire constructed in accordance with an embodiment of my invention; and Fig. 2 is a sectional view taken substantially on the line 2—2 of Fig. 1.

As disclosed in the accompanying drawings, C denotes a casing or carcass of any ordinary or preferred construction and in which is adapted to be positioned my improved core A. As herein set forth, my improved core A comprises a plurality of annular portions 1 spaced apart circumferentially of the tire and wherein adjacent portions 1 are tied or connected at substantially diametrically opposed points by the interposed portions 2.

The annular portions 1 and the interposed portions 2 are formed of compressible material and preferably pure rubber and it is to be understood that the size of the opening of each of the annular members 1 is to be in accordance with the weight of the vehicle with which the tire coacts.

The portions 2 are disposed circumferentially and are so related as to extend spirally and preferably so related as to make substantially three convolutions to a tire so that the resistance offered by the core A to the casing or carcass C will be distributed in such a manner as to result in a maximum of efficiency.

From the foregoing description, it is thought to be obvious that a tire constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

An inclosed core for a tire comprising a plurality of circumferentially spaced annular portions, and connecting portions extending therebetween, said connecting portions being disposed spirally.

In testimony whereof I hereunto affix my signature in the presence of two witnesses.

ISON B. IRONS.

Witnesses:
C. W. FARRAR,
J. R. SUMMERS.

Copies of this patent may be obtained for five cents each, by addressing the "Commissioner of Patents, Washington, D. C."